Feb. 14, 1961 E. W. BRENNAN ET AL 2,971,371
DYNAMIC DEMULSIBILITY METHOD AND APPARATUS
Filed Aug. 19, 1955
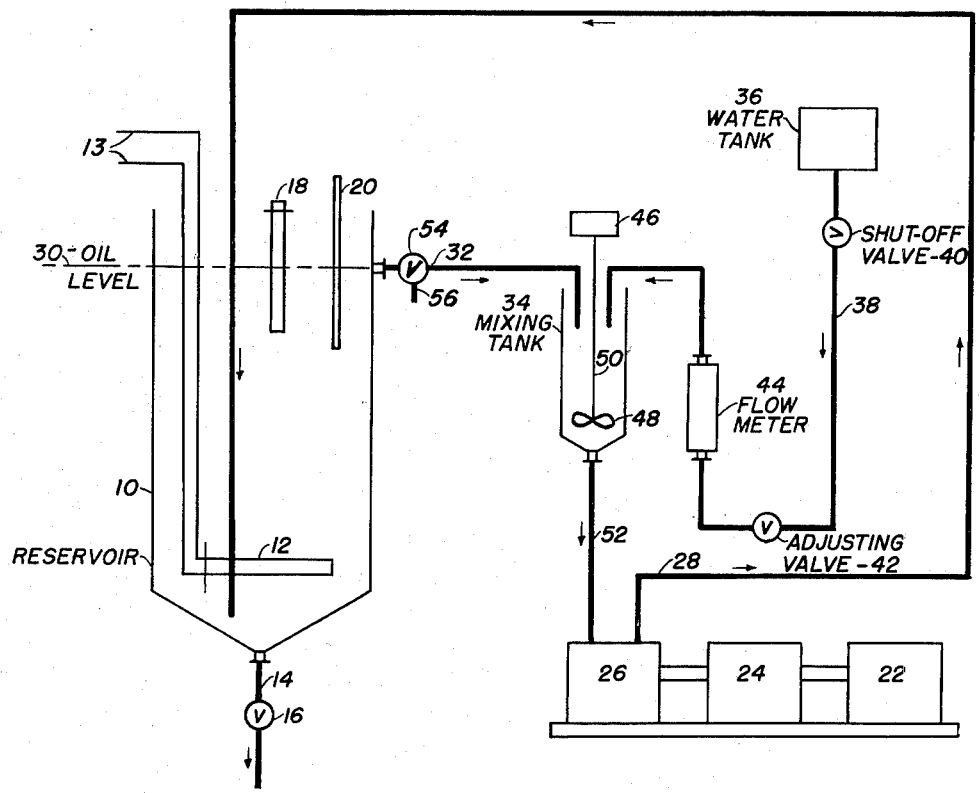
INVENTORS
ROBERT G. MOYER
ELMER W. BRENNAN
BY
*Edward H. Fang*
ATTORNEY

United States Patent Office 2,971,371
Patented Feb. 14, 1961

2,971,371

DYNAMIC DEMULSIBILITY METHOD AND APPARATUS

Elmer W. Brennan, Dundee, and Robert G. Moyer, Crystal Lake, Ill., assignors to The Pure Oil Company, Chicago, Ill., a corporation of Ohio Filed Aug. 19, 1955, Ser. No. 529,552

19 Claims. (Cl. 73—53)

The present invention is related to a method and apparatus for determining the demulsibility propensity of liquid-liquid systems, i.e., the service demulsibility characteristics of oils. More specifically, the invention relates to a method and apparatus for determining the dynamic demulsibility of liquid-liquid systems under conditions which give an evaluation of the one of said liquids, as for example a lubricating oil, comparable to the findings under service conditions. The invention will be described in relation to water contamination of oils during use.

The final criterion of an industrial lubricating oil, as typified by a paper-machine oil or turbine oil, is its performance under service conditions. While numerous tests have been devised by which a given oil may be judged or compared with other oils for a given purpose, it is generally known that these tests often do not rate the oils in the order of performance level which subsequent commercial service reveals. Consequently, the only real test of an oil is its behavoir under actual or simulated normal commercial operating conditions. Full-scale tests take considerable time, and are undertaken with grave misgivings because of the danger and risk of damaging large and expensive machinery, as for example, papermaking machines or steam turbines.

What has been said of lubricating oil tests generally is particularly true for demulsification tests. One of the oldest and most widely applied tests is the Herschel Demulsibility Test, which measures the rate of oil separation from a water-oil emulsion. This test is run as follows:

To 53 cc. of distilled water in a chemically cleaned cylinder is added 27 cc. of the oil to be tested. The cylinder is then placed in a bath and its temperature raised to 130° F.±1° F. (or 180° F.±1° F.). The sample is stirred by rotating the paddle at 1500 r.p.m. for exactly five minutes. The paddle is then stopped, withdrawn from the cylinder and wiped clean with the finger or rubber policeman, returning to the cylinder as much of the emulsion as possible. The temperature of the cylinder is maintained at 130° F. (or 180° F.) throughout the test. The position of the line of demarcation between the topmost layer of oil and adjacent emulsion is read one minute after rotation of the paddle has been stopped and at one minute intervals thereafter for 35 minutes, until the rate of settling has reached the maximum and then decreased. With oils which act normally, the rate of settling out of the oil increases up to a maximum and then decreases. The maximum rate of settling, in cubic centimeters per hour, is called the demulsibility of the oil and is recorded as the numerical result of the test.

The formula for calculating the rate is:

$$\frac{60}{\text{Time of settling (min.)}} \times \text{cc. oil separated} = \text{rate}$$

For example, with a time interval of maximum settling rate of 5 minutes and a value of 20 cc. for the separated oil, the rate will equal: $60/5 \times 20 = 240$.

Another related test is the so-called test for Steam Emulsion of Lubricating Oils, known formally as ASTM D157–51T. This test is commonly used for turbine oils, but also may be used for other lubricating oils. The Steam Emulsion Number obtained by this test is the number of seconds required for an oil to separate under definitely prescribed conditions, from a water emulsion after having been emulsified with the water. The test results obtained by the Herschel method and the ASTM D157–51T method are typical of tests which are lacking in correlation with field performance. Typical results obtained by these tests, illustrating the lack of correlation, will subsequently be compared with results obtained by the present method and apparatus.

Accordingly, the present invention relates to a dynamic demulsibility test apparatus and method wherein a given volume of oil sample is continuously circulated from a constant level and constant temperature reservoir into a mixing chamber where it is thoroughly mixed with water under conditions and at a rate which are adjustable to correspond with normal commercial operating or service conditions for the oil, and from which it is returned to the reservoir. The time, temperatures, flow rates, mixing rates and circulation rates are all adjustable, and samples may be taken from certain places in the system for determination of the proportions of oil and water present to indicate the ability of the oil to separate from the water. The oil is circulated at rates which provide reservoir residence times the same, or variable within the same limits, as those used in commercial applications of the oil. The water contamination rate is adjusted to provide a relatively severe condition or to parallel the contamination conditions to which the oil will be subjected in commercial applications. These rates in addition to the temperatures, conditions of mixing and settling, and the length of the test period, will vary in accordance with the particular industrial application for which the oil is formulated, the type of oil, and other factors, such as the amount of water contamination which may be present.

The dynamic demulsibility values will reflect the amount of water taken up by the oil and carried thereby to the parts being lubricated. Dynamic demulsibility values may be determined at various intervals during the test period or only at the end of the test. Comparisons of test results may be made to show any rates of change of demulsibility with time.

Primarily, the object of our invention is, therefore, to provide a method and apparatus for determining, experimentally, the service demulsibility properties of one liquid with another, as for example lubricating oil used in the presence of water. This object and further objects will become apparent and will be described in the following description of the invention.

The invention is best described by reference to the attached drawing which schematically represents one embodiment of our apparatus, with certain of the parts shown diagrammatically. In the drawing, a reservoir 10 having a capacity of 2½ gallons is provided with heater 12 and draw-off line 14 controlled by valve 16. Heater 12 may comprise any form of heating element designed to bring the oil to temperatures above room temperature with a maximum temperature of about 200° F. being attainable. The reservoir 10 is fitted with a thermostatic control 18 which is connected with heating element 12 by electrical circuit 13 for the purpose of maintaining the reservoir fluid temperature within plus or minus 2° F. of the desired test temperature. Thermometer 20 is provided to measure the temperature of the oil but a thermocouple may also be employed. Motor 22 operates through gear reducer 24 to turn pump 26. Conduit 28 leads from pump 26 downward through the top of the reservoir. The oil will seek level 30 in reservoir 10 controlled by overflow 32. Oil flowing through overflow 32 drops into mixing tank 34 wherein it meets water from tank 36 flowing through conduit 38, controlled by valves 40 and 42. Flow-meter 44 is provided within conduit 38 to measure the rate of water addition or contamination that has been established. Valve 40 may be used as a shut-off valve and valve 42 as an adjusting valve for the purpose of controlling the rate of addition of water in relation to the oil circulation rate to closely simulate industrial conditions. A T-blade stirrer 46 operates within mixer 34, the stirrer or impeller blade being represented as 48 and operating from shaft 50.

The overflow oil and water are thoroughly mixed within mixing tank 34 and pass through conduit 52 into the intake side of pump 26 from whence the mixture is circulated back to reservoir 10 via conduit 28. Samples are taken at draw-off 14 by means of valve 16 and from over-flow 32 by means of 3-way valve 54 and branch line 56. The water contamination rate, controlled by valve 42 in cooperation with flow meter 44 is subjected to variation to approach actual use conditions for the oil. In commercial use, water contamination may vary widely, depending on physical condition of the equipment components, such as gaskets, etc., and on the type of machinery being lubricated. In general, however, contamination above about 7% is prevented by mechanical maintenance and design and it has been found that contamination rates of about 2-7% of the oil circulation rate successfully emulate industrial conditions. It has been found that most oils can be satisfactorily evaluated using water contamination rates of about 4 to 5% of the oil circulation rate.

To initiate the tests, reservoir 10 is filled with the oil sample until the oil overflows through line 32 and fills tank 34 to about ⅓ to ¾ full and preferably to about half-full. Pump 26 is started along with stirrer 46 and the oil sample is brought to the desired temperature which may range from room temperature to as high as 200° F. Valve 40 is opened and valve 42, in conjunction with the flow meter 44, is adjusted to provide the desired water contamination rate. The oil circulation rate is adjusted to maintain an oil residence time of about 30-60 minutes in reservoir 10. A reservoir residence time of about 30 to 40 minutes has been found to be satisfactory in evaluating paper machine oils and turbine oils. As the circulation of oil continues, liquid is intermittently or continuously withdrawn from the bottom of reservoir 10 via line 14 to maintain a constant total in the system and to compensate for the added water introduced from tank 36. Reservoir 10 and tank 34 are preferably open at the top, so that a constant check may be had on the liquid levels therein. Reservoir 10 and mixing tank 34 may have any desired capacity. The oil is continuously circulated for the designated test period which may range from 1 to 10 hours. A test period of about 6 hours gives consistent results. During this time samples of liquid may be taken from line 14 for determination of water content, and the values so determined reported as "percent water at the draw-off." Samples also may be removed at line 56 for determination of water content and the results reported as "percent water retained in oil." At the end of the test period, before circulating pump 26 is shut off, final samples are taken from line 14 and line 56. These will constitute the main part of the test in most cases and have been found to give consistent and repeatable results.

The samples are analyzed using known methods. For example, the samples may be taken directly into centrifuge tubes and subjected to centrifuging to determine the proportions of water and oil. ASTM method D96-52 may be used. Samples may be subjected to distillation with refluxing to find the composition as by ASTM method D95-46. Another method would be to dilute each sample with 50% precipitation naphtha using the technique outlined under ASTM method D91-52.

In order to further demonstrate the invention and the numerous advantages of the test apparatus of this invention, the following experiments show that the method permits definite distinctions to be made between the demulsibility characteristics of oils which are rated as equivalents in demulsibility characteristics according to the present standard bench tests. In making these tests, a number of commercially available paper-machine oils were tested in accordance with the standard bench tests and the method just described using a flow rate of about 4.0 gal./hr. The residence time in the reservoir was 37.5 minutes for each sample. These oils have been given the arbitrary designations A through G in the table.

TABLE I

| Oil Sample | Herschel Demul. at 130° F. | SE No. | Dynamic Demulsibility test—6 hrs. at 130° F. | |
|---|---|---|---|---|
| | | | Percent H₂O entrained in oil | Percent H₂O in oil at draw-off |
| A | <50 | 600 | 4.2 | |
| B | 380 | 1,200+ | 3.6 | |
| C | <50 | 1,200+ | 10.5 | |
| D | <50 | 1,020 | 6.8 | |
| E | <50 | 1,200+ | 28 | 45 |
| F | <50 | 1,020 | 31 | 65 |
| G | 1,200 | 720 | 4.2 | 80 |

From Table I it is apparent that oils having the same Herschel Demulsibility number at 130° F. and exhibiting different Steam Emulsion numbers (SE No. in the table) were found to entrain different percentages of water when evaluated by the present Dynamic Demulsibility test. Compare, for example, oil samples A and C, and D and E. Sample B, which has a higher Herschel Demulsibility than Sample A and a higher Steam Emulsion number than Sample A, is shown to entrain smaller amounts of water. Samples D and F which have the same Herschel Demulsibility numbers and Steam Emulsion numbers are shown to vary greatly in the percent of water entrained. Oil sample G having a very high Herschel Demulsibility number and a relatively high Steam Emulsion number entrains a relatively small percentage of water. The present test method enables one to distinguish between oils which have substantially equivalent demulsibility characteristics according to present standard bench tests and allows more accurate evaluation of the suitability of the oils for industrial application.

The method and apparatus is used to evaluate any type of oil for demulsibility characteristcs; these would include paper machine oils, turbine oils (with additives) and base oils (without additives). It is generally desirable that such oils during use separate from water readily and thus be made available to circulate in a lubricating system to give maximum protection to the working parts without losses of lubricating properties due to entrained water. In carrying out the method, the water used to make the test is maintained at the same temperature as the contaminating water in the industrial system which generally is about 80° F. In the test apparatus, the circulation rate of the oil is selected to provide a reservoir residence time equivalent to that encountered in the anticipated industrial application; a residence period of 30-60 minutes usually being employed.

In general, when using a reservoir of about 2½ gallon capacity, circulation rates, adjusted by pump speed reducer 24, of from about 2 to 10 gals./hr. are sufficient to encompass normally encountered industrial reservoir residence periods in use. The test method shows directly any oil loss that may be experienced due to removal by contaminating water. This value is represented by the total amount of oil removed with the water at draw-off line 14 during the test. Ideally, this value should be zero, that is there should be no oil contamination at this point. The test method also shows directly the extent of water accumulation in the circulating oil. Unduly high water concentrations in the oil adversely affect the lubricating ability of the oil, and the "percent water retained in oil," determined on the samples withdrawn at line 56, should therefore ideally be 0%.

In comparing ratings determined by the subject method with those obtained by previous methods, those oils which have good demulsibility characteristics according to standard bench tests would be expected to show a small percent of water in the oil sampled at line 56. Comparison of samples E, F and G in Table I shows this to be true as far as the Herschel Demulsibility number is concerned, but correlation with the Steam Emulsion number of these oils has been found lacking. Thus, sample G, having the lowest Steam Emulsion number (the test indicated demulsibility) shows the greatest percent water entrained when tested by the subject method.

In order to further demonstrate the invention, a series of tests was made, using the new method and apparatus to evaluate various other oils, including base oils, turbine oils, and paper machine oils, to show oils which give acceptable results and oils which display poor demulsibility. These results are shown in the following Table II. In Table II the individual sample numbers designate different oils evaluated and in each case the "percent water retained" and "percent water at the draw-off" were determined at the end of six hours of continuous testing. The flow rate was 4.0 gals./hr. and the residence time in the reservoir was 37.5 minutes.

TABLE II

*Dynamic demulsibility tests*

| Sample | Type | Temp., °F. | Percent Water Retained in Oil | Percent Water Draw-Off Point |
|---|---|---|---|---|
| 1 | Base Oil | 130 | 1.5 | 98 |
| 2 | do | 130 | 16 | 85 |
| 3 | Turbine | 80 | 5.5 | 95 |
| 4 | do | 80 | 2.4 | 95 |
| 5 | do | 80 | 4.4 | 85 |
| 6 | do | 80 | 7.0 | 97 |
| 7 | do | 80 | 6.0 | 95 |
| 8 | Paper Mach. Oil | 130 | 4.8 | 75 |
| 9 | do | 130 | 3.0 | 90 |
| 10 | do | 130 | 31, 31 | 40, 40 |
| 11 | do | 130 | 14 | 100 |
| 12 | do | 130 | 24 | 90 |
| 13 | do | 130 | 12 | 90 |
| 14 | do | 130 | 14 | 75 |
| 15 | do | 130 | 10 | 85 |
| 16 | do | 130 | 11 | 70 |
| 17 | do | 130 | 16 | 80 |
| 18 | do | 130 | 14 | 100 |
| 19 | do | 130 | 14 | 90 |
| 20 | do | 130 | 12 | 100 |
| 21 | do | 130 | 10 | 98 |
| 22 | do | 130 | 10 | 80 |
| 23 | do | 130 | 10 | 80 |

Sample 1 in Table II is an example of a base oil exhibiting good demulsibility. Oil Sample 2 is an example of a base oil which shows poor demulsibility. The turbine oils tested in Table II had a viscosity of about 150 SUS at 100° F. Since no correlation has been found to exist between the percent of water retained in oil at line 56 and the percent of water at draw-off 14, each item appears to have its own significance. Sample 10 shows the repeatability of results obtained for the "percent water retained" and "percent water at draw-off."

In order to show the effect of a change in temperature, additional tests were made, evaluating paper machine oil samples 8 through 18 at 180° F. These results are shown in Table III.

TABLE III

*Dynamic demulsibility tests*

| Sample | Type | Temp., °F. | Percent Water Retained in Oil | Percent Water at Draw-Off Point |
|---|---|---|---|---|
| 8 | Paper Mach. Oil | 180 | 4.0 | 50 |
| 9 | do | 180 | 3.6 | 77 |
| 10 | do | 180 | 4.0 | 70 |
| 11 | do | 180 | 4.0 | 99 |
| 12 | do | 180 | 3.7 | 100, 100 |
| 13 | do | 180 | 4.0 | 98 |
| 14 | do | 180 | 8.0 | 80 |
| 15 | do | 180 | 10 | 95 |
| 16 | do | 180 | 8 | 85 |
| 17 | do | 180 | 2.5 | 90 |
| 18 | do | 180 | 5.6 | 100 |

From Table III it is seen that the demulsibility of the paper machine oils was improved at the higher temperatures. Data obtained on sample 12 are also illustrative of the repeatability of results that may be obtained by the subject test method. In Table III the "percent of water retained" and the "percent water at the draw-off" were determined at the end of 6 hour circulating periods.

The method of this invention is carried out by maintaining a constant supply of first test liquid in a reservoir at a substantially constant temperature, and continuously allowing the oil to overflow from the reservoir into a mixing chamber, where it is mixed with a second liquid which is continuously introduced at a rate substantially less than the circulation rate of the first liquid. The liquid-liquid mixture in the mixing chamber is maintained therein with agitation for a period of time sufficient to insure adequate mixing. The mixture from the mixing chamber is continuously withdrawn and returned to the reservoir. The rate of withdrawal of the mixture from the reservoir is such that the mixture or liquid-liquid system therein is maintained substantially quiescent for a period of time closely approximating the quiescent period of the first liquid under service conditions. At the end of, or during a predetermined time which may be from one hour to as many as 10 hours, which time is dependent upon the characteristics of the particular first liquid being tested and the type of information desired, the percent of said second liquid at the draw-off point and the percent of said second liquid retained in the first liquid at the overflow point are determined. During the testing of first liquid, portions of the liquid-liquid mixture in the reservoir are removed from time to time in order to compensate for the increased volume due to the addition of said second liquid to the system. The method may be carried out by maintaining the first liquid sample at a temperature between the freezing and boiling points of said second liquid.

The apparatus broadly comprises a reservoir to contain the first liquid sample, means for maintaining a substantially constant temperature in the reservoir, the means for withdrawing and circulating a constant supply of the first liquid from the reservoir and to maintain a substantially constant level therein, the mixing chamber, the conduit leading into the mixing chamber, and the means associated therewith to adjust the rate of flow of second liquid, along with the return conduit and the means for returning the liquid-liquid mixture back to the reservoir.

The method and apparatus are broadly applicable to those instances wherein the liquid system to be investigated is one in which a base oil, compounded oil, steam cylinder oil, paper machine oil or turbine oil or other organic liquid is used as a lubricant, coolant, or solvent in an apparatus, process or machine wherein unwanted contamination from a second liquid, such as an aqueous medium, substantially immiscible with the first liquid is experienced. In such instances and related systems the invention gives a direct indication of the dynamic demulsibility propensity of the first liquid with the second liquid under conditions adjustable to substantially duplicate the environment of contaminating use.

Although the invention has been described in relation to particular examples, these are not to be construed as limitations and the only limitations attaching to this invention appear in the appended claims.

What is claimed is:

1. The method of determining the dynamic demulsibility of a test liquid with a second liquid of dissimilar density therefrom which comprises establishing a circulating system of said test liquid at a substantially constant temperature between a reservoir and a mixing chamber, introducing incremental portions of said second liquid into said mixing chamber, maintaining said liquids in said mixing chamber for a time sufficient to achieve complete mixing thereof, and determining the volume ratios of said test liquid and said second liquid in selected samples taken from the top and bottom portions of said reservoir as an indication of the demulsibility of said test liquid.

2. The method of determining the dynamic demulsibility of a test liquid with a second liquid of dissimilar density therefrom which comprises establishing a supply of said test liquid in a reservoir maintained at a substantially constant temperature, withdrawing the liquid from an overflow from said reservoir into a mixing chamber, introducing a portion of said second liquid into said mixing chamber at a rate of about 2 to 7% the rate of introduction of said test liquid, said portion being in an amount substantially less than the amount of liquid in said mixing chamber, maintaining said liquids in said mixing chamber for a time sufficient to achieve complete mixing, withdrawing the mixture so produced and returning same to said reservoir to maintain a substantially constant volume therein, withdrawing a portion of the liquid from said overflow from said reservoir and determining the amount of said second liquid in said withdrawn portion as an indication of the demulsibility of said test liquid.

3. The method of determining the dynamic demulsibility propensity of a test liquid in a second liquid of dissimilar density therefrom which comprises establishing a supply of said test liquid in a reservoir maintained at a substantially constant temperature and liquid level, continuously withdrawing the liquid from an overflow from said reservoir into a mixing chamber, continuously introducing said second liquid into said mixing chamber at a rate of about 2 to 7% of the rate of introduction of the liquid from said reservoir, maintaining said liquids in said mixing chamber for a time sufficient to achieve complete mixing, continuously recycling the mixture so produced back to said reservoir, withdrawing a portion of the liquid from the top of said reservoir and determining the amount of said second liquid in said withdrawn portion as an indication of the demulsibility of said test liquid.

4. The method in accordance with claim 3 in which a sufficient portion of said liquid mixture is withdrawn at the bottom portion of said reservoir to maintain the liquid level in said reservoir substantially constant and the amount of said second liquid in said withdrawn mixture is determined.

5. The method in accordance with claim 3 in which the rate of withdrawal of said test liquid from said reservoir is such that the liquid system therein is maintained substantially quiescent for a period of time substantially equal to the quiescent period of said test liquid under service conditions.

6. The method in accordance with claim 3 in which said test liquid is an oil and said second liquid is an aqueous medium.

7. The method of determining the water demulsibility propensity of lubricating oils under dynamic conditions substantially equivalent to the conditions under which said lubricating oils are used in lubricating machinery in the presence of water which comprises establishing a supply of said oil at a constant level in a reservoir heated to a substantially constant test temperature, continuously withdrawing oil from an overflow from said reservoir into a mixing chamber, continuously introducing water into said mixing chamber at a rate of about 2 to 7% of the rate of introduction of said oil, maintaining said oil and water in said mixing chamber for a time sufficient to provide thorough mixing, continuously withdrawing the oil and water mixture therefrom at a point removed from the point of introduction of oil and water in said mixing chamber, returning said mixture to said reservoir, withdrawing a sample of said mixture from the bottom portion of said reservoir and determining the amount of oil retained in said sample at the end of the test period as a measure of the dynamic demulsibility of said lubricating oil.

8. The method in accordance with claim 7 in which the liquid mixture accumulating in the bottom of said reservoir is drawn off to compensate for the increased volume due to the addition of water, and the amount of water in the oil flowing from said reservoir into said mixing chamber is determined as a measure of the dynamic demulsibility of said lubricating oil.

9. The method in accordance with claim 7 in which the oil-water mixture from said mixing chamber is pumped to the reservoir at a rate of about 2 to 10 gallons per hour and the rate of introduction of said water into said mixing chamber is about 5.0 percent of the rate of circulation of said mixture.

10. The method in accordance with claim 9 in which the supply of oil is about 2½ gallons, the rate of pumping said oil and water is about 4.0 gallons per hour and the test is conducted for 6 hours.

11. The method in accordance with claim 7 in which said oil-water mixture is maintained in said reservoir for a residence time of about 30 minutes to one hour.

12. The method in accordance with claim 11 in which said oil-water mixture is maintained in said reservoir for a residence time of about 37.5 minutes.

13. The method in accordance with claim 7 in which the oil is heated to a temperature between about room temperature to about 200° F. in said reservoir.

14. The method of determining the dynamic demulsibility of lubricating oils which comprises maintaining a supply of said oil at a constant level in a reservoir heated to a substantially constant test temperature of between about room temperature and about 200° F. allowing a constant stream of said oil to overflow from said reservoir into a mixing chamber, continuously introducing water into said mixing chamber at a rate of about 5% of the rate of the introduction of said oil, thoroughly mixing said oil and water in said mixing chamber, continuously withdrawing the oil and water mixture from the bottom of said mixing chamber, returning said mixture to said reservoir at a point below said constant level, allowing the recycled mixture to remain in said reservoir for a residence time of about 37.5 minutes, determining the amount of water retained in the oil overflowing from said reservoir at the end of a predetermined time, drawing off water accumulated in the bottom of said reservoir, determining the amount of oil in the water so withdrawn and thereby obtaining an indication of the demulsibility of the oil samples under dynamic conditions.

15. A dynamic demulsibility apparatus which comprises, in combination, a first reservoir to contain a liquid sample, means for maintaining said liquid sample at a substantially constant temperature, means for withdrawing and circulating a constant supply of said liquid sample from said first reservoir to maintain a substantially constant level therein, a mixture chamber to receive said liquid sample withdrawn from said reservoir, a second reservoir to contain a second liquid, a conduit leading from said second reservoir to said mixing chamber, meter means in said conduit, means to adjust the flow of said second liquid therein to said mixing chamber, a second conduit leading from said mixing chamber, pumping means connected to said second conduit, and a return conduit leading from said pumping means back to said first reservoir.

16. An apparatus in accordance with claim 15 in which the first reservoir is equipped with a bottom drain and control valve and means for operating said pump at a constant delivery rate.

17. The apparatus in accordance with claim 15 in which said means for maintaining a substantially constant level in said first reservoir comprises an overflow pipe near the top of said first reservoir connecting to the upper portion of said mixing chamber.

18. An apparatus in accordance with claim 15 in which the conduit leading from said second liquid reservoir to said mixing chamber terminates in the upper portion thereof.

19. An apparatus in accordance with claim 15 in which said return conduit leads to a point near the bottom of said first reservoir.

References Cited in the file of this patent

UNITED STATES PATENTS 1,770,735  Funk ------------------ July 15, 1930